United States Patent [19]

Duncan et al.

[11] 3,850,651

[45] Nov. 26, 1974

[54] CEMENTING COMPOSITIONS AND CONCRETES AND MORTARS DERIVED THEREFROM

[75] Inventors: Frederic James Duncan; Ronald George Chappell, both of Runcorn, England

[73] Assignee: Imperial Chemical Industries Limited, London, England

[22] Filed: Mar. 20, 1973

[21] Appl. No.: 343,169

[30] Foreign Application Priority Data
Apr. 13, 1972  Great Britain .................. 17069/72

[52] U.S. Cl. ................................. 106/90
[51] Int. Cl. ............................... C04b 7/02
[58] Field of Search ....................... 106/90

[56] References Cited
UNITED STATES PATENTS

| | | | |
|---|---|---|---|
| 3,021,291 | 2/1962 | Thiessen | 260/2.5 |
| 3,030,664 | 4/1962 | Sodertalje | 18/47.5 |
| 3,042,643 | 7/1962 | Foster | 260/29.7 |
| 3,487,038 | 12/1969 | Toy et al. | 260/29.7 |
| 3,538,036 | 11/1970 | Peters et al. | 260/29.6 |

FOREIGN PATENTS OR APPLICATIONS

| | | | |
|---|---|---|---|
| 1,313,268 | 4/1973 | Great Britain | |
| 1,111,697 | 5/1968 | Great Britain | 106/90 |
| 938,567 | 10/1963 | Great Britain | 106/90 |
| 248,033 | 3/1926 | Great Britain | 106/90 |
| 165,399 | 1962 | U.S.S.R. | 106/90 |

*Primary Examiner*—Delbert E. Gantz
*Assistant Examiner*—John P. Sheehan
*Attorney, Agent, or Firm*—Cushman, Darby & Cushman

[57] ABSTRACT

Concretes and mortars having improved mechanical properties and resistance to chemicals are obtained by incorporating vinyl polymers or copolymers into cementing compositions and effecting curing (after a period of initial setting) at an elevated temperature.

16 Claims, No Drawings

CEMENTING COMPOSITIONS AND CONCRETES AND MORTARS DERIVED THEREFROM

This invention relates to concretes and mortars. More particularly, it relates to concretes and mortars derived from cementing compositions incorporating polymers and copolymers derived from polymerisable vinyl compounds.

It is known to incorporate polymeric materials in Portland cement compositions in order to impart greater mechanical strength to concretes and mortars derived therefrom. Polymers previously used for this purpose include polyvinylacetate and styrene/butadiene copolymers, but the known methods of preparation of compositions containing such polymers, wherein curing is carried out at substantially ambient temperature, may give rise to concretes and mortars having poor chemical resistance. In the specification of our UK Pat. No. 970,334 there are described certain cementing compositions comprising Portland cement and at least one copolymer of (a) vinyl chloride and/or vinylidene chloride and (b) acrylic or methacrylic esters derived from aliphatic alcohols having from 1 to 6 carbon atoms; the curing of the said compositions is described as being carried out at 21°C.

We have now found that concretes and motars having improved mechanical properties and resistance to chemicals, as well as good weathering properties, may be obtained by incorporating vinyl polymers and copolymers in cementing compositions provided that the curing of the cementing composition is carried out at an elevated temperature.

Thus according to the present invention there is provided a method of preparation of a concrete or mortar which comprises curing a cementing composition comprising a water-insoluble polymer or copolymer derived from one or more polymerisable vinyl compounds, the curing being effected, after a period of initial setting, at a temperature of at least 40°C.

Suitable polymers and copolymers which may be incorporated in the cementing composition include those derived from acrylic esters, methacrylic esters, vinyl acetate, vinyl chloride, vinylidene chloride, styrene, acrylonitrile, butadiene and vinyl esters of long chain carboxylic acids (e.g., carboxylic acids containing 8 to 12 carbon atoms). It is preferred to use alkyl acrylate/alkyl methacrylate copolymers, for example those having from 1 to 8 carbon atoms in the alkyl group, but other copolymers which may be used include styrene/acrylic ester and styrene/butadiene copolymers. It is especially preferred to use the homopolymers of methyl methacrylate or the copolymers of methyl methacrylate and 2-ethylhexyl acrylate.

The polymers or copolymers may also comprise the residue of an ethylenically unsaturated carboxylic acid copolymerisable with the basic polymers. The acids may vary according to the particular polymers or copolymers, but suitable acids for use in the acrylic/methacrylic ester polymers and copolymers include acrylic acid, methacrylic acid and itaconic acid. An especially preferred copolymer comprises methyl methacrylate, 2-ethylhexyl acrylate and acrylic acid.

The polymers and copolymers preferably have glass transition temperatures ($T_G$) of at least 10°C, especially 20°C or higher. For thermoplastic copolymers the glass transition temperatures may be calculated from the weight fractions of monomers present in the copolymer and the glass transition temperatures of the homopolymers of the monomers. The glass transition temperatures may be calculated by the known methods and particularly by the simplified equation $$1/T_{G(co)} = W_1/T_{G(1)} + W_2/T_{G(2)} + \ldots W_n/T_{G(n)}$$

where $W_1, W_2 \ldots W_n$ are the weight fractions of monomers $1, 2 \ldots n$ present in the copolymer, and $T_{G(1)} T_{G(2)} \ldots T_{G(n)}$ are the glass transition temperatures of the homopolymers of monomers $1, 2 \ldots n$, and $T_{G(co)}$ is the glass transition temperature of the copolymer. Thus our preferred copolymer of methyl methacrylate and ethylhexyl acrylate may vary in glass transition temperature according to the relative proportions of polymethyl methacrylate ($T_G$ of 105°C) and polyethyl hexyl acrylate ($T_G$ of −85°C). In general, the mechanical strength (e.g., compressive strength) of the resultant concrete or mortar will increase with an increase in the glass transition temperature of the polymer or copolymer used, subject to the proviso that a polymer or copolymer of higher glass transition temperature will require either a higher temperature of curing or a longer curing time.

The cementing composition may comprise materials conventionally used in the production of concrete and mortar, for example hydraulic cements (for example Portland cement) and aggregates, for example sand and gravel. Reinforcing materials, for example fibrous materials, may also be incorporated.

The proportion of polymer or copolymer (calculated on a dry basis) incorporated into the cementing composition is preferably in the range 5 percent to 50 percent, especially 15 percent to 35 percent, by weight based on the weight of the cement component of the composition. In general, the mechanical strength (e.g., compressive strength) of the resultant concrete or mortar increases with an increase in the proportion of polymer or copolymer in the cementing mixture.

The aforesaid polymers or copolymers may be incorporated into the cementing composition as a water-dispersible dry solid (as prepared, for example by conventional emulsion polymerisation followed by spray drying). Alternatively, emulsion polymers or copolymers may be incorporated as such into the cementing composition. It will be understood that the emulsion polymers and copolymers may contain ingredients which are used in the well-established techniques involving polymerisation of the monomer or monomers in an aqueous medium. Such ingredients include catalysts (for example ammonium persulphate, alkali metal persulphates), surfactants chosen to promote the production of a stable emulsion, and buffering agents (for example alkali metal or ammonium carbonates). An antifoaming agent may also be advantageously incorporated in the emulsion polymer or copolymer to reduce the occlusion of air in the concretes and mortars subsequently produced.

The temperature and duration of heating in the curing stage may be varied within wide limits, but in general concretes and mortars of increased strength are obtained at higher curing temperatures and/or with longer curing times. It is preferred to use a curing temperature of at least 50°C, for example in the range 50°C to 200°C, especially in the range 70°C to 160°C. It is especially preferred to use a temperature of 90°C or above. The upper limit of temperature will be dependent on the particular polymer because of the risk of thermal degradation to certain polymers at higher temperatures. The actual temperatures adopted will depend on the glass transition temperature of the polymers incorporated into the cementing composition (polymers or copolymers with higher glass transition temperatures require higher curing temperatures) and on the increase in mechanical strength required of the resulting concretes and mortars. The duration of heating is preferably at least 12 hours (conveniently from 12 to 72 hours) but shorter or longer periods may be used if desired according to temperature of curing and the increase in mechanical strength required in the concrete and mortars. Thus, for example, when the curing temperature is 90°C or higher, a beneficial effect may in some cases be obtained when the duration of heating is 4 hours.

Concretes and mortars may conveniently be prepared by mixing cement, aggregates and a previously prepared emulsion (or particulate water-dispersible solid) polymer or copolymer, for example in a concrete mixer, and then adding further water if desired. The aggregates which may be used include any coarse or fine-grained materials known in the processing of concrete, for example sand or gravel.

The minimum period of initial setting will depend upon the particular cementing composition and may readily be determined by trail. In general, it is preferred to allow the composition to stand for at least 12 hours (conveniently at substantially ambient temperature) before carrying out the final curing.

The concretes and mortars thus produced have high compressive and tensile strengths and show good resistance to attack by water and chemicals, e.g., hydrochloric acid and aqueous sulphate solutions. The said concretes and mortars find particular application in the manufacture of shaped articles in the form of precast units, e.g., pipes, facing panels, beams and flooring sections, and also in the form of lightweight building materials, e.g., lightweight lime/sand building blocks.

The invention is illustrated by the following Examples. Parts and percentages are by weight unless otherwise stated.

Compressive strengths throughout are quoted in the units meganewtons per square metre ($MN/m^2$). 1 $Mn/m^2$ = 145 $lb/in^2$.

Example 1

Cement mortars were prepared to the following formulations, using an aqueous dispersion of an emulsion copolymer of 75.5% methyl methacrylate, 22.5% 2-ethylhexyl acrylate and 2% acrylic acid (by weight). The water content was controlled to give mortars of similar consistency. The calculated $T_G$ of the copolymer is 35°C.

| Formulation | 1 | 2 | 3 | 4 | 5 |
|---|---|---|---|---|---|
| Cement | 100 | 100 | 100 | 100 | 100 |
| Sand | 200 | 200 | 200 | 200 | 200 |
| Polymer Dispersion (50% solids) | — | 14.3 | 28.6 | 42.7 | 57.1 |
| Water | 42.7 | 31.4 | 17.1 | 4.3 | — |
| Antifoaming agent (Defoamer 1052M supplied by Hercules Powder Co.) | — | 0.14 | 0.27 | 0.43 | 0.57 |

The test blocks (2½ in × 1½ in × 1½ in) were prepared by mixing the polymer dispersion, water and defoamer, and adding this mixture to the cement and sand. After thorough mixing, the mortar was placed in moulds, covered to prevent evaporation of water, and stored for 1 day at approximately 20°C to allow initial setting prior to removal from the mould.

Blocks prepared according to formulation 1 were covered and stored at approximately 20°C till the compressive strength was determined after 7 or 28 days by use of a hydraulic press, the pressure being applied to the 2½ in × 1½ in sides of the blocks.

Blocks prepared according to formulations 2–5 were heated for 16 hours at 160°C, and the compressive strength was determined 7 or 28 days after heat treatment.

The compressive strengths observed are shown below:

| Formulation | 1 | 2 | 3 | 4 | 5 |
|---|---|---|---|---|---|
| Compressive strength - 7 days ($MN/m^2$) | 24.6 | 35.7 | 64.6 | 76.5 | 79.3 |
| Compressive strength - 28 days ($MN/m^2$) | 23.8 | 41.10 | 65.6 | 72.3 | 81.4 |

Example 2

A cement mortar was prepared according to the following formulation, using an aqueous dispersion of an emulsion copolymer of 75.5% methyl methacrylate, 22.5% 2-ethylhexyl acrylate and 2% acrylic acid by weight. The calculated $T_G$ of the copolymer is 35°C.

| Cement | 100 |
|---|---|
| Sand | 300 |
| Polymer dispersion (50% solids) | 64.3 |
| Antifoaming agent (as in Example 1) | 0.9 |

Test blocks were prepared as described in Example 1, and, after demoulding, were covered and stored at approximately 20°C for 28 days. Blocks were then heated in an oven at 90°C, 70°C or 50°C for various times, and the compressive strength of the blocks was determined 1 day after removal from the oven.

| Heating time (days) | Time from demoulding (days) | Compressive Strength ($MN/m^2$) | | |
|---|---|---|---|---|
| | | 50°C Treatment | 70°C Treatment | 90°C Treatment |
| 1 | 30 | 54.1 | 69.0 | 78.0 |
| 3 | 32 | 58.5 | 69.9 | 90.8 |
| 14 | 43 | 78.2 | 95.8 | 108.2 |

Blocks prepared in the same way, but stored at approximately 20°C for 30, 32 and 43 days showed compressive strengths of 39.1, 42.3 and 54.9 $MN/m^2$ respectively.

Example 3

Cement mortars were prepared according to the following formulation, using aqueous dispersion of various emulsion copolymers.

| | |
|---|---|
| Cement | 100 |
| Sand | 300 |
| Polymer dispersion (50% solids) | 57.1 |
| Water | 3.6 |
| Antifoaming agent (as in Example 1) | 0.9 |

The emulsion copolymers used were prepared from various mixtures of monomers as shown below:

| | 1 | 2 | 3 | 4 |
|---|---|---|---|---|
| Methyl methacrylate | 98 | 83 | 75.5 | 65 |
| 2-Ethylhexyl acrylate | — | 15 | 22.5 | 33 |
| Acrylic acid | 2 | 2 | 2 | 2 |
| $T_G$ (°C) | 105 | 55 | 35 | 10 |

Test blocks were prepared as in Example 1, and after demoulding, were heated in an oven at 90°C or 160°C for 16 hours. The compressive strength was determined 30 days after heat treatment.

| Emulsion polymer used | Compressive Strength (MN/m²) | |
|---|---|---|
| | After 90°C heating | After 160°C heating |
| 1 | 68.4 | 97.9 |
| 2 | 86.4 | 95.0 |
| 3 | 82.5 | 90.7 |
| 4 | 63.8 | 87.2 |

A cement mortar of similar consistency was prepared by mixing 50 parts of water with 100 parts cement and 300 parts sand. After curing at approximately 20°C for 30 days, the compressive strength was 29.6 MN/m².

Example 4

Cement mortars were prepared according to the following formulation, using an aqueous dispersion of an emulsion copolymer of 75% styrene, 23% 2-ethylhexyl acrylate and 2% acrylic acid (by weight). The calculated $T_G$ of the copolymer is 31°C.

| | |
|---|---|
| Cement | 100 |
| Sand | 300 |
| Polymer dispersion (50% solids) | 57.1 |
| Antifoaming agent (as in Example 1) | 1.4 |

The test blocks were prepared as in Example 1, and after demoulding, were heated to 90°C or 160°C for 16 hours. The compressive strength was determined 30 days after the heat treatment.

| Compressive Strength | Temperature of Heat Treatment | |
|---|---|---|
| | 90°C | 160°C |
| NM/m² | 60.7 | 52.1 |

Example 5

Cement mortars were prepared according to the following formulation, using an aqueous dispersion of any emulsion copolymer of 75.5% methyl methacrylate, 22.5% 2-ethylhexyl acrylate and 2% acrylic acid (by weight). The calculated $T_G$ of the copolymer is 35°C.

| | |
|---|---|
| Cement | 100 |
| Sand | 300 |
| Polymer dispersion (50% solids) | 57.1 |
| Antifoaming agent (as in Example 1) | 0.82 |

The test blocks were prepared as in Example 1, and after demoulding and curing at approximately 20°C for 15–28 days, the test blocks were heated in an oven for 12 hours at 160°C.

Unmodified cement mortars of similar consistency were prepared at the same time by mixing 50 parts water with 100 parts cement and 300 parts sand, and, after demoulding, were stored at approximately 20°C for 15–28 days.

The unmodified and polymer containing blocks were then tested as described below:

1. Freeze - thaw stability

The test blocks were weighed, and after soaking in water for 72 hours were subjected to repeated cycles of freezing and thawing till 25 percent of the original weight had been lost, this being taken as the point of failure of the test. Throughout the test, the blocks were kept damp by application of water at intervals.

12 unmodified cement mortar blocks were tested, and of these, one failed after 444 cycles, one after 478 cycles, one after 484 cycles and two after 576 cycles. Surface cracks were observed on all 7 unmodified cement mortar blocks after 576 cycles.

In contrast, all 12 polymer-containing blocks were completely free from surface cracks, and showed no weight loss after 576 cycles:

2. Resistance to hydrochloric acid 12 polymer containing and 12 unmodified test blocks were weighed and immersed in 15 percent aqueous hydrochloric acid solution. At intervals the blocks were removed from the acid solution and weighed. The average weight losses observed are shown in the table below:

| Time (days) | % weight loss | |
|---|---|---|
| | Polymer modified mortar | Unmodified mortar |
| 8 | 2.9 | 18.6 |
| 14 | 2.9 | Total disintegration |
| 30 | 3.5 | |
| 355 | 7.5 | |

3. Resistance to sulphate solution 12 polymer-containing and 12 unmodified cement mortar blocks were subjected to repeated cycles of immersion in a 2.1 percent aqueous solution of sodium sulphate for 16 hours and drying for 1 hours at 54°C. The length of the test blocks was measured before testing, and at various times throughout the test. The average increase in length is noted below:

| Test Cycles | % increase in length (average) | |
|---|---|---|
| | Polymer modified mortar | Unmodified mortar |
| 12 | 0.04 | 0.16 |
| 15 | 0.05 | 0.19 |
| 35 | 0.05 | 0.43 |
| 82 | 0.10 | Disintegration |
| 170 | 0.10 | — |
| 250 | 0.10 | — |

Example 6

Cement mortars were prepared by adding aqueous dispersions of various emulsion copolymers, together with water and 1-2 percent of antifoaming agent (as in Example 1) based on the weight of polymer dispersion, to a mixture of 100 parts of cement and 300 parts of sand. The cement mortars contained 5.5–6.9 percent of polymer.

Test blocks were prepared as in Example 1, and, after initial setting at 20°C and demoulding were heated in an oven at 160°C for 16 hours. The compressive strength was determined 30 days after heat treatment

| Copolymer | Compressive Strength (MN/m²) |
|---|---|
| A | 97.9 |
| B | 95.0 |
| C | 90.7 |
| D | 57.5 |
| E | 52.1 |
| F | 82.4 |
| G | 42.5 |
| H | 37.6 |

The emulsion copolymers A to H were as follows:-

A Prepared from a mixture of 98% methyl methacrylate and 2% acrylic acid.

B Prepared from a mixture of 83% methyl methacrylate, 15% 2-ethylhexyl acrylate and 2% acrylic acid.

C Prepared from a mixture of 75.5% methyl methacrylate, 22.5% 2-ethylhexyl acrylate and 2% acrylic acid.

D Prepared from a mixture of 75% styrene, 23% 2-ethylhexyl acrylate and 2% acrylic acid.

E Prepared from a mixture of 83% styrene, 15% 2-ethylhexyl acrylate and 2% acrylic acid.

F 'Primal' AC73, an acrylic emulsion copolymer supplied by Rohm & Haas (UK) Limited.

G 'Aeronal' 290D, a styrene/acrylate emulsion copolymer supplied by Badische Anilin & Soda-Fabrik AG.

H 'Revinex' 29Y40, a styrene/butadiene copolymer supplied by Revertex Limited.

Example 7

Cement mortars were prepared as in Example 6 using aqueous dispersions of various emulsion copolymers. The quantities of aqueous dispersion and water were adjusted to give a dry polymer content of 8 percent in the cement mortars, and cement mortar compositions of sililar consistency.

Test blocks were prepared as in Example 1 and, after demoulding, were stored for 7 days at approximately 20°C, heated in an oven at 90°C, 130°C or 160°C for 16 hours, and stored for a further 7 days at approximately 20°C. By way of comparison, some blocks were not heated, but were only stored at approximately 20°C for 14 days.

Unmodified cement mortar blocks of similar consistency were prepared at the same time by mixing 50 parts water with 100 parts cement and 300 parts sand and, after demoulding, were stored and heated in the same way as the polymer modified cement mortar blocks.

The blocks were then tested as follows:- i. The compressive strength was determined, and is shown in the table below.

ii. The resistance to hydrochloric acid was determined by weighing the test blocks and immersing them in 15 percent hydrochloric acid solution. After 4 weeks immersion the blocks were removed from the acid solution and weighed. The percent weight loss is shown in the table below:

iii. The resistance to sulphate solution was determined as described in Example 5. The percent increase in length after 4 weeks (20 cycles) was measured.

| Emulsion Copolymer | Compressive Strength (MN/m²) | | | |
|---|---|---|---|---|
| | after storing at 20°C | after heating at | | |
| | | 90°C | 130°C | 190°C |
| I | 43.2 | 55.2 | 89.2 | 101.5 |
| J | 40.0 | 61.8 | 81.8 | 85.9 |
| K | 56.6 | 65.3 | 85.1 | 81.6 |
| L | 51.1 | 66.3 | 77.2 | 69.0 |
| M | 38.7 | 49.8 | 81.1 | 82.2 |
| N | 54.0 | 59.3 | 51.1 | 100.5 |
| — | 21.2 | 20.2 | 19.4 | 19.6 |

| Emulsion Copolymer | % weight loss in HCl solution | | | |
|---|---|---|---|---|
| | after storing at 20°C | after heating at | | |
| | | 90°C | 130°C | 190°C |
| I | 7.6 | 5.5 | 5.0 | 4.1 |
| J | 11.7 | 8.8 | 5.9 | 5.5 |
| K | 5.1 | 3.2 | 2.4 | 2.8 |
| L | 5.7 | 4.2 | 3.3 | 2.7 |
| M | 9.2 | 8.0 | 6.3 | 7.3 |
| N | 11.3 | 8.6 | 11.0 | 5.4 |
| — | | | disintegrated | |

| Emulsion Copolymer | % length increase in sulphate solution | | | |
|---|---|---|---|---|
| | after storing at 20°C | after heating at | | |
| | | 90°C | 130°C | 190°C |
| I | 0.12 | 0.04 | 0.08 | 0.12 |
| J | 0.06 | 0.00 | 0.08 | 0.06 |
| K | 0.14 | 0.08 | 0.10 | 0.12 |
| L | 0.22 | 0.18 | 0.18 | 0.16 |
| M | 0.08 | 0.02 | 0.08 | 0.08 |
| N | 0.10 | 0.16 | 0.16 | 0.28 |
| — | 0.18 | 0.76 | 0.10 | 0.10 |

The emulsion copolymers I to N were as follows:

I Prepared from a mixture of 98% methyl methacrylate and 2% acrylic acid.

J Prepared from a mixture of 75.5% methyl methacrylate, 22.5% 2-ethylhexyl acrylate and 2% acrylic acid.

K 'Primal' AC73, a thermoplastic acrylic emulsion polymer supplied by Rohm and Haas (UK) Limited.

L 'Primal' AC201, a thermosetting acrylic emulsion polymer supplied by Rohm and Haas (UK) Limited.

M 'Primal' AC658, a thermosetting acrylic emulsion polymer supplied by Rohm and Haas (UK) Limited.

N 'Primal' HA16, a self-crosslinking acrylic emulsion polymer supplied by Rohm and Haas (UK) Limited.

Example 8

Concrete was prepared to the following formulation, using an aqueous dispersion of an emulsion copolymer of 75.5% methyl methacrylate, 22.5% 2-ethylhexyl acrylate and 2% acrylic acid by weight. The calculated Tg of the copolymer is 35°C.

| Cement | 100 |
| Sand | 200 |
| Aggregate | 400 |
| Polymer Dispersion (50% solids) | 40 |
| Water | 10 |
| Antifoaming Agent (As in Example 1) | 0.6 |

Test blocks (4 inches × 4 inches × 4 inches) were prepared by adding the polymer dispersion containing the antifoaming agent, and the water to the cement/sand/aggregate mixture. After thorough mixing, the concrete was placed in moulds, covered to prevent evaporation of water, and stored for 2 days at approximately 20°C to allow initial setting prior to demoulding. The test blocks were stored for 7 days at approximately 20°C and were then heated at 70, 100, 132 or 162°C for 1, 2 or 7 days. The compressive strength of the blocks was determined 12–15 days after the start of the heat treatment.

The compressive strengths (in MN/m²) observed are shown below:

| Heat Treatment Temperature | Duration of Heat Treatment (Days) | | |
| --- | --- | --- | --- |
| | 1 | 2 | 7 |
| 100°C | 78.2 | 86.9 | 103.8 |
| 133°C | 101.8 | 105.7 | 125.0 |
| 162°C | 107.6 | 117.8 | 124.5 |

Test blocks prepared in the same way, but omitting the heat treatment, were tested 20 days after demoulding; the compressive strength was 69.4 MN/m².

Example 9

Concrete was prepared as in Example 8, but using an aqueous dispersion of an emulsion copolymer of 98% methyl methacrylate and 2% acrylic acid. The calculated Tg of the copolymer is 105°C.

The compressive strengths observed (measured in MN/m²) are shown below:

| Heat Treatment Temperature | Duration of Heat Treatment (Days) | | |
| --- | --- | --- | --- |
| | 1 | 2 | 7 |
| 100°C | 80.1 | 89.3 | 109.6 |
| 133°C | 111.5 | 114.0 | 133.6 |
| 162°C | 120.6 | 130.6 | 140.2 |

Test blocks prepared in the same way, but omitting the heat treatment, were tested 19 days after demoulding; the compressive stength was 73.9 NM/m².

Example 10

Concrete was prepared as in Example 8, but using an aqueous dispersion of an emulsion copolymer of 83% methyl methacrylate, 15% 2-ethylhexyl acrylate and 2% acrylic acid. The calculated Tg of the copolymer is 55°C. The compressive strengths observed (measured in MN/m²) are shown below:

| Heat Treatment Temperature | Duration of Heat Treatment (Days) | | |
| --- | --- | --- | --- |
| | 1 | 2 | 7 |
| 70°C | 70.9 | 73.8 | 86.4 |
| 100°C | 78.2 | 90.7 | 105.7 |
| 132°C | — | 109.5 | 120.6 |
| 162°C | 103.8 | 118.2 | 123.1 |

Test blocks prepared in the same way, but omitting the heat treatment, were tested 20–22 days after demoulding; the compressive strength was 66.7 MN/m².

Example 11

Concrete was prepared as in Example 8, but using an aqueous dispersion of an emulsion copolymer of 70% methyl methacrylate, 28% 2-ethylhexyl acrylate and 2% acrylic acid. The calculated Tg of the copolymer is 20°C.

The compressive strengths observed (measured in MN/m²) are shown below:

| Heat Treatment Temperature | Duration of Heat Treatment (Days) | | |
| --- | --- | --- | --- |
| | 1 | 2 | 7 |
| 70°C | 72.4 | 72.9 | 84.0 |
| 100°C | 73.8 | 81.6 | 96.5 |
| 132°C | — | 98.5 | 112.5 |
| 162°C | 90.5 | 101.4 | 104.3 |

Test blocks prepared in the same way, but omitting the heat treatment, were tested 20–22 days after demoulding; the compressive strength was 65.1 NM/m².

Example 12

Cement mortars were prepared to the following formulation, using an aqueous dispersion of an emulsion copolymer of 75.5% methyl methacrylate, 22.5% 2-ethylhexyl acrylate and 2% acrylic acid. The calculated Tg of the copolymer is 35°C.

| | |
|---|---|
| Cement | 100 |
| Sand | 300 |
| Polymer Dispersion (50% solids) | 57.1 |
| Antifoaming agent (as in Example 1) | 0.5 |

Test blocks were prepared as described in Example 1, and, after demoulding, were covered and stored at approximately 20°C for 25-31 days. The blocks were then heated in an oven at 100°C or 134°C for various times, and the compressive strength of the blocks was determined 1 day after removal from the oven.

| Heating Time (Hours) | Compressive Strength (NM/m²) | |
|---|---|---|
| | 134°C Treatment | 100°C Treatment |
| 0 | 29.7 | 30.3 |
| 3 | — | 38.3 |
| 4 | 32.2 | — |
| 7 | — | 48.3 |
| 8 | 36.2 | — |
| 13 | — | 48.7 |
| 14 | 36.4 | — |
| 24 | 39.1 | 57.2 |
| 48 | 48.1 | 59.0 |
| 72 | 56.9 | 67.0 |
| 144 | 61.3 | — |

What we claim is:

1. A method of preparation of a concrete or mortar which comprises curing a cement composition comprising:
   i. an inorganic cement; and
   ii. an aqueous dispersion of a copolymer derived from (a) one or more alkyl acrylates and/or alkyl methacrylates having from 1 to 8 carbon atoms in the alkyl group and (b) an ethylenically-unsaturated carboxylic acid copolymerizable therewith,
the said curing being effected, after a period of initial setting, at an elevated temperature of at least 40°C.

2. A method according to claim 1 wherein the curing temperature is at least 50°C.

3. A method according to claim 2 wherein the curing temperature is in the range 50°C to 200°C.

4. A method according to claim 3 wherein the curing temperature is in the range 70°C to 160°C.

5. A method according to claim 2 wherein the curing temperature is at least 90°C.

6. A method according to claim 1 wherein the curing period at the elevated temperature is at least 12 hours.

7. A method according to claim 1 wherein the period of initial setting is at least 12 hours.

8. A method as claimed in claim 1 wherein the initial setting is effected at substantially ambient temperature.

9. A method according to claim 1 wherein the alkyl methacrylate is methyl methacrylate.

10. A method according to claim 1 employing both an alkyl acrylate and an alkyl methacrylate wherein the alkyl acrylate is 2-ethylhexyl acrylate and the alkyl methacrylate is methyl methacrylate.

11. A method according to claim 1 wherein the ethylenically-unsaturated carboxylic acid is acrylic acid or methacrylic acid.

12. A method according to claim 1 wherein there is employed a copolymer of methyl methacrylate, 2-ethylhexyl acrylate and acrylic acid.

13. A method according to claim 1 wherein the copolymer has a glass transition temperature of at least 10°C.

14. A method according to claim 13 wherein the copolymer has a glass transition temperature of at least 20°C.

15. A method according to claim 1 wherein the proportion of copolymer (calculated on a dry basis) is from 5 percent to 50 percent by weight of the inorganic cement component of the composition.

16. A method according to claim 15 wherein the proportion of copolymer is from 15 percent to 35 percent of the cement component.

* * * * *